United States Patent
Shih

(10) Patent No.: US 6,772,520 B1
(45) Date of Patent: Aug. 10, 2004

(54) PRUNING SHEARS

(76) Inventor: Cheng-Hsiung Shih, 58, Ma Yuan West St., Taichung (TW)

( * ) Notice: Subject to any disclaimer, the term of this patent is extended or adjusted under 35 U.S.C. 154(b) by 0 days.

(21) Appl. No.: 10/676,441

(22) Filed: Sep. 29, 2003

(51) Int. Cl.[7] .............................................. B26B 13/20
(52) U.S. Cl. .............................. 30/190; 30/251; 30/262
(58) Field of Search .......................... 30/190, 188, 251, 30/250, 262, 261

(56) References Cited

U.S. PATENT DOCUMENTS

| | | | |
|---|---|---|---|
| 192,426 A | * 6/1877 | Foltz et al. | .................. 30/251 |
| 1,447,483 A | * 3/1923 | Pazos | ........................... 30/250 |
| 4,094,064 A | * 6/1978 | Nishikawa et al. | ............ 30/92 |
| 6,000,307 A | * 12/1999 | Aamodt | ......................... 83/13 |

* cited by examiner

Primary Examiner—Douglas D Watts

(57) ABSTRACT

A pair of pruning shears includes a first handle, a blade seat, a blade, a second handle, a connecting member, and a spring. Thus, the spring mounted between the first handle and the second handle is disposed at an oblique state, thereby decreasing the pressing force applied on the user's hand, so that the user can hold the grip of the first handle and the second handle smoothly and comfortably, thereby facilitating the user operating the pruning shears.

16 Claims, 4 Drawing Sheets

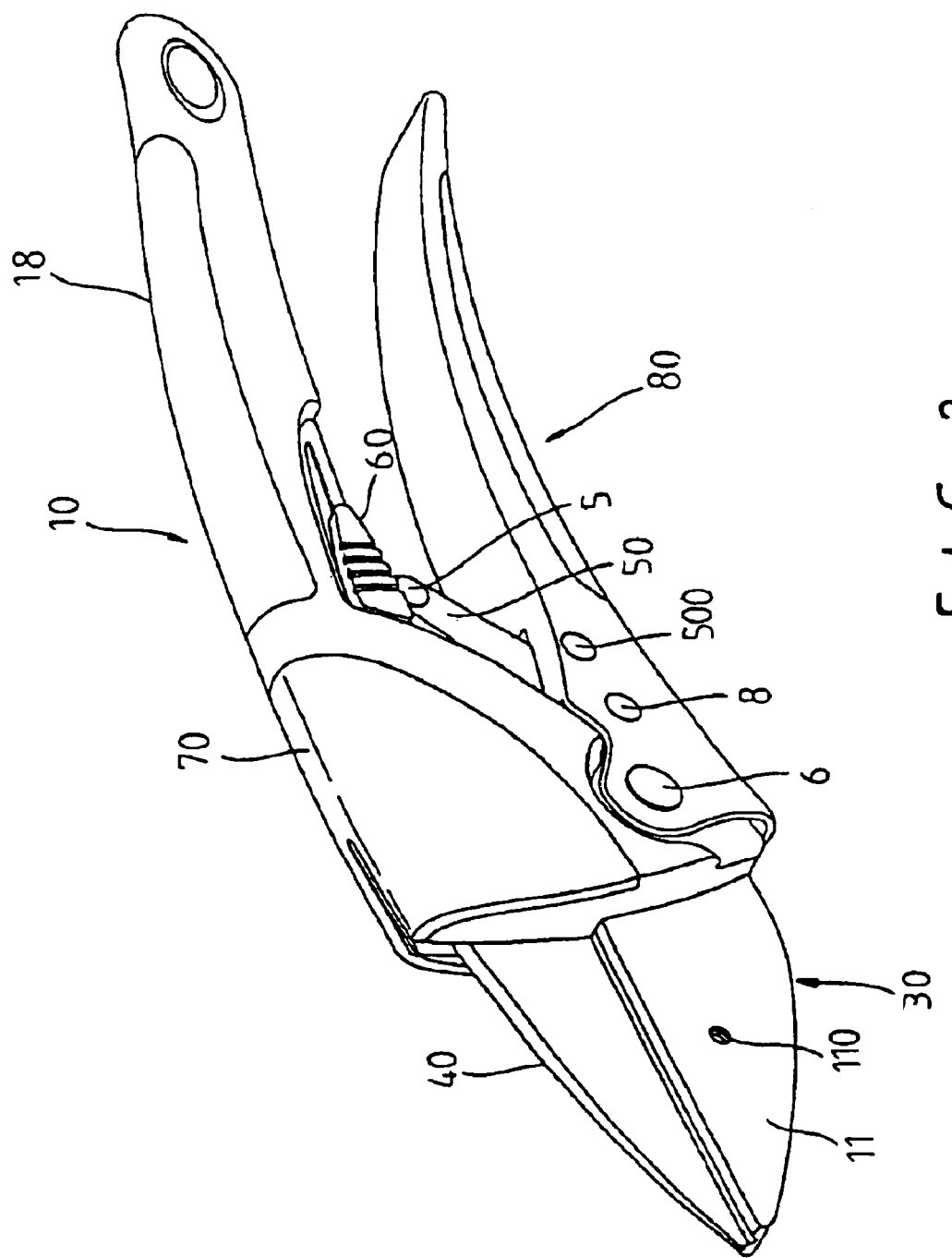
F I G. 2

PRUNING SHEARS

BACKGROUND OF THE INVENTION

1. Field of the Invention

The present invention relates to a pair of pruning shears, and more particularly to a pair of pruning shears, wherein the user can hold the grip of the first handle and the second handle smoothly and comfortably, thereby facilitating the user operating the pruning shears.

2. Description of the Related Art

A conventional pair of pruning shears comprises a first handle, a second handle pivotally connected with the first handle, and a compression spring mounted between the first handle and the second handle. Thus, the user's one hand can exert a force to hold the first handle and the second handle to compress the compression spring, so that the front ends of the first handle and the second handle are moved toward each other so as to cut the plant therebetween. However, the user has to exert a larger force to overcome the elastic force of the compression spring, thereby causing consumption of the manual work and energy.

SUMMARY OF THE INVENTION

The primary objective of the present invention is to provide a pair of pruning shears, wherein the spring mounted between the first handle and the second handle is disposed at an oblique state, thereby decreasing the pressing force applied on the user's hand, so that the user can hold the grip of the first handle and the second handle smoothly and comfortably, thereby facilitating the user operating the pruning shears.

Another objective of the present invention is to provide a pair of pruning shears, wherein the spring mounted between the first handle and the second handle is disposed at an oblique state, thereby obtaining the optimum support effect.

A further objective of the present invention is to provide a pair of pruning shears, wherein the spring is located adjacent to the pivot pin between the second handle and the first handle, thereby providing the optimum effect to restore the second handle to the original position.

In accordance with the present invention, there is provided a pair of pruning shears, comprising:

a first handle;

a blade seat mounted on a first end of the first handle;

a blade having a mediate portion pivotally mounted on the first end of the first handle;

a second handle having a first end pivotally mounted on the first end of the first handle;

a connecting member having a first end pivotally mounted on a first end of the blade and a second end pivotally mounted on a mediate portion of the second handle; and a spring mounted between the first end of the first handle and the first end of the second handle and disposed at an oblique state for pressing the mediate portion of the second handle to move downward relative to the first handle to move the connecting member downward so as to move the blade upward relative to the first handle and the blade seat.

Further benefits and advantages of the present invention will become apparent after a careful reading of the detailed description with appropriate reference to the accompanying drawings.

BRIEF DESCRIPTION OF THE DRAWINGS

FIG. 2 is a perspective assembly view of the scissors as shown in FIG. 1;

DETAILED DESCRIPTION OF THE INVENTION

Figure 1:
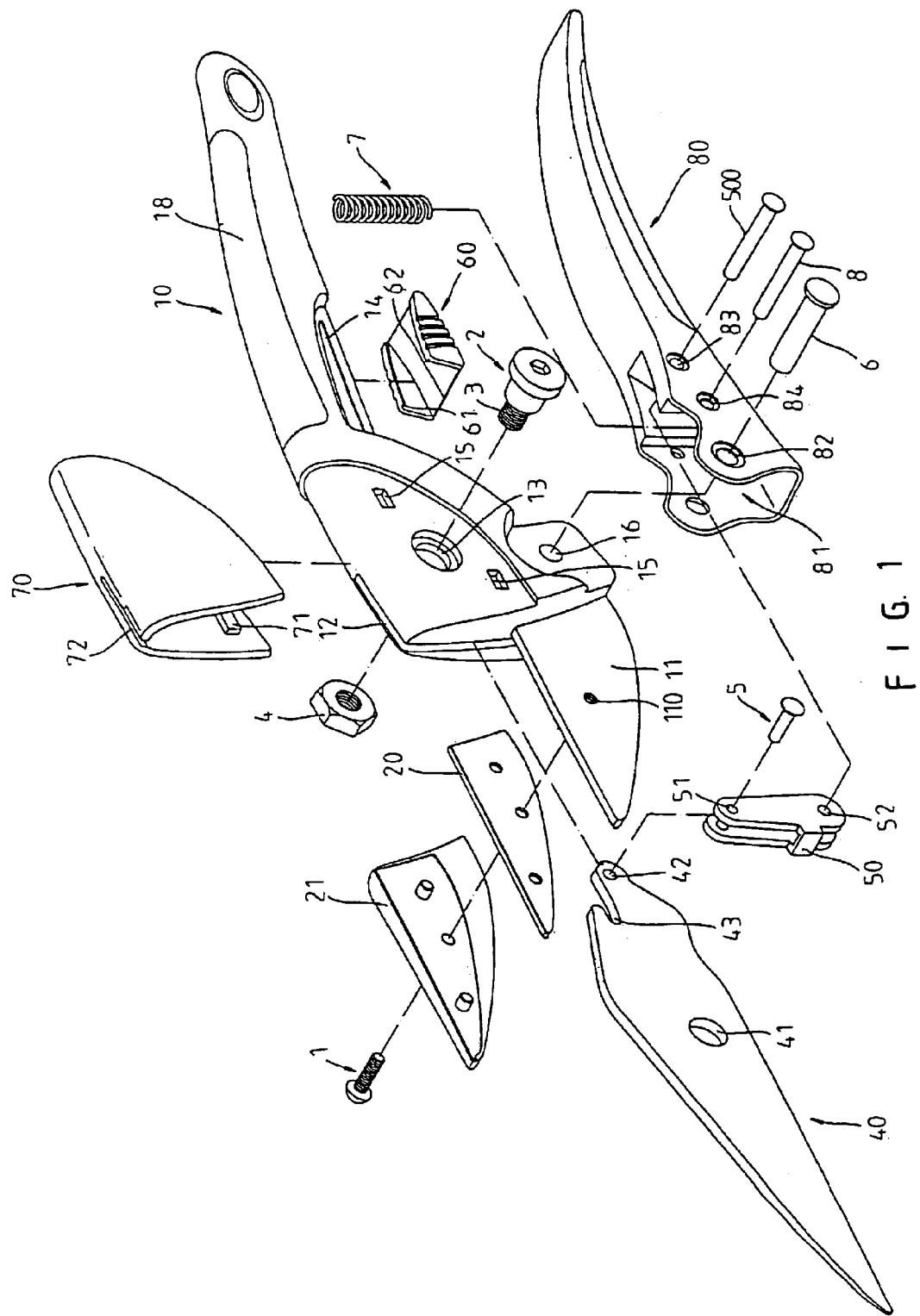
FIG. 1 is an exploded perspective view of a pair of pruning shears in accordance with the preferred embodiment of the present invention.
Figure 3:
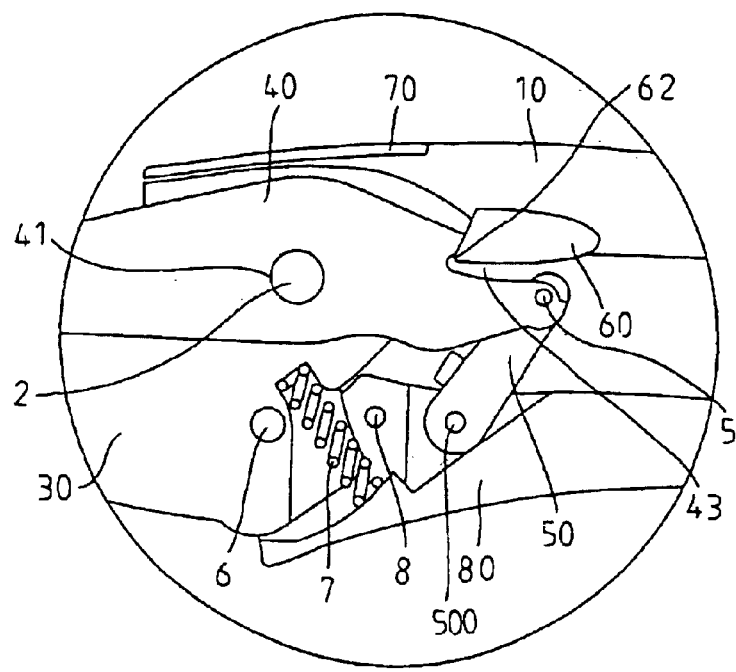
FIG. 3 is a partially cut-away plan view of the scissors as shown in FIG. 2.

Referring to the drawings and initially to FIGS. 1–3, a pair of pruning shears in accordance with the preferred embodiment of the present invention comprise a first handle 10, a blade seat 30 mounted on a first end of the first handle 10, a blade 40 having a mediate portion pivotally mounted on the first end of the first handle 10, a second handle 80 having a first end pivotally mounted on the first end of the first handle 10, a connecting member 50 having a first end pivotally mounted on a first end of the blade 40 and a second end pivotally mounted on a mediate portion of the second handle 80, and a spring 7 mounted between the first end of the first handle 10 and the first end of the second handle 80 and disposed at an oblique state for pressing the mediate portion of the second handle 80 to move downward relative to the first handle 10 to move the connecting member 50 downward so as to move the blade 40 upward relative to the first handle 10 and the blade seat 30.

The first end of the first handle 10 is formed with a shaft hole 13, the mediate portion of the blade 40 is formed with a shaft hole 41, and the pruning shears further comprise a pivot bolt 2 extended through the shaft hole 13 of the first handle 10 and the shaft hole 41 of the blade 40, and a nut 4 screwed on an outer thread 3 of the pivot bolt 2, so that the mediate portion of the blade 40 is pivotally mounted on the first end of the first handle 10. The first end of the first handle 10 is formed with a receiving chamber 12 for mounting the blade 40.

The pruning shears further comprise a cover 70 mounted on the first end of the first handle 10 to encompass the pivot bolt 2 and the nut 4. The first end of the first handle 10 has a periphery formed with a plurality of fixing holes 15, and the cover 70 has an inner wall formed with a plurality of fixing blocks 71 inserted into the fixing holes 15 of the first handle 10, so that the cover 70 is fixed on the first handle 10. The cover 70 is formed with a passage 72 for passage of the blade 40.

The blade seat 30 includes an abutting plate 11 secured on the first end of the first handle 10 and juxtaposed to the blade 40, a bushing 20 mounted on the abutting plate 11, an end cap 21 mounted on the bushing 20, and a screw 1 extended through the end cap 21 and the bushing 20 and screwed into a screw bore 110 formed in the abutting plate 11.

The first end of the blade 40 is formed with a through hole 42, the first end of the connecting member 50 is formed with a through hole 51, and the pruning shears further comprise a pivot pin 5 extended through the through hole 51 of the connecting member 50 and the through hole 42 of the blade 40, so that the first end of the connecting member 50 is pivotally mounted on the first end of the blade 40.

In addition, the second end of the connecting member 50 is formed with a through hole 52, the mediate portion of the second handle 80 is formed with a through hole 83, and the pruning shears further comprise a pivot pin 500 extended through the through hole 83 of the second handle 80 and the through hole 52 of the connecting member 50, so that the second end of the connecting member 50 is pivotally mounted on the mediate portion of the second handle 80.

In addition, the first end of the first handle 10 has a lower portion formed with a pin hole 16, the first end of the second handle 80 is formed with a pin hole 82, and the pruning shears further comprise a pivot pin 6 extended through the pin hole 82 of the second handle 80 and the pin hole 16 of the first handle 10, so that the first end of the second handle 80 is pivotally mounted on the first end of the first handle 10.

Figure 1A:
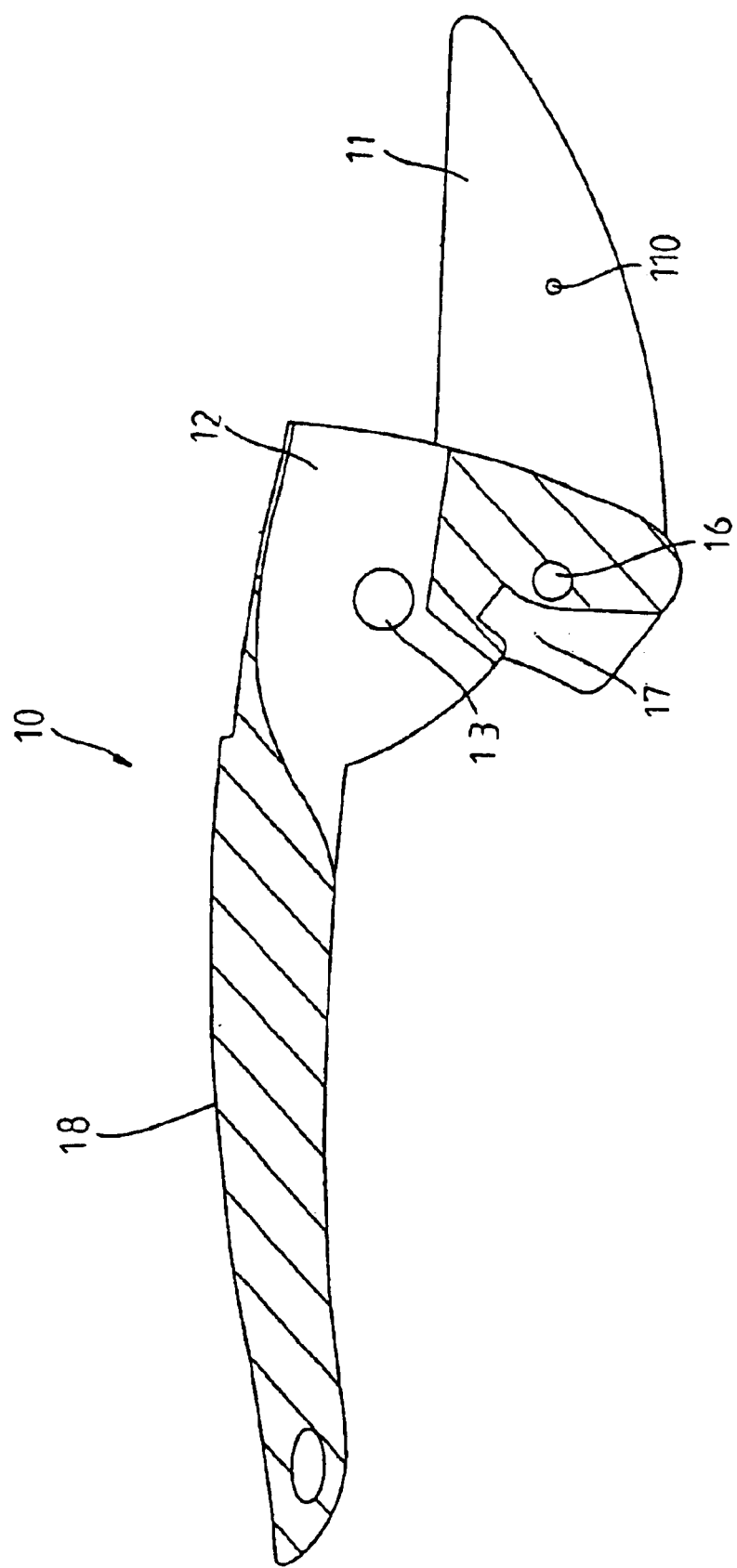
FIG. 1A is a cross-sectional view of a first handle of the scissors as shown in FIG. 1.

The lower portion of the first end of the first handle 10 is formed with a receiving recess 17 (see FIG. 1A), the second handle 80 is formed with an opening 81, and the spring 7 has a first end received in the receiving recess 17 of the first handle 10 and a second received in the opening 81 of the second handle 80.

In addition, the second handle 80 is formed with a limit hole 84 located between the pin hole 82 and through hole 83, and the pruning shears further comprise a limit pin 8 extended through the limit hole 84 of the second handle 80 and rested on the spring 7 for closely retaining the spring 7 without detachment.

The first handle 10 has a mediate portion formed with a slideway 14 and a second end formed with a grip 18. In addition, the first end of the blade 40 is formed with a locking groove 43. The pruning shears further comprise a switch 60 movably mounted on the first handle 10 and having a bottom plate 62 locked in the locking groove 43 of the blade 40. Preferably, the switch 60 has two side walls each formed with a protruding slide 61 slidably mounted in the slideway 14 of the first handle 10.

In operation, referring to FIGS. 1–4, the bottom plate 62 of the switch 60 is locked in the locking groove 43 of the blade 40 as shown in FIG. 3, so that the blade 40 is fixed on the first handle 10 without movement.

Figure 4:
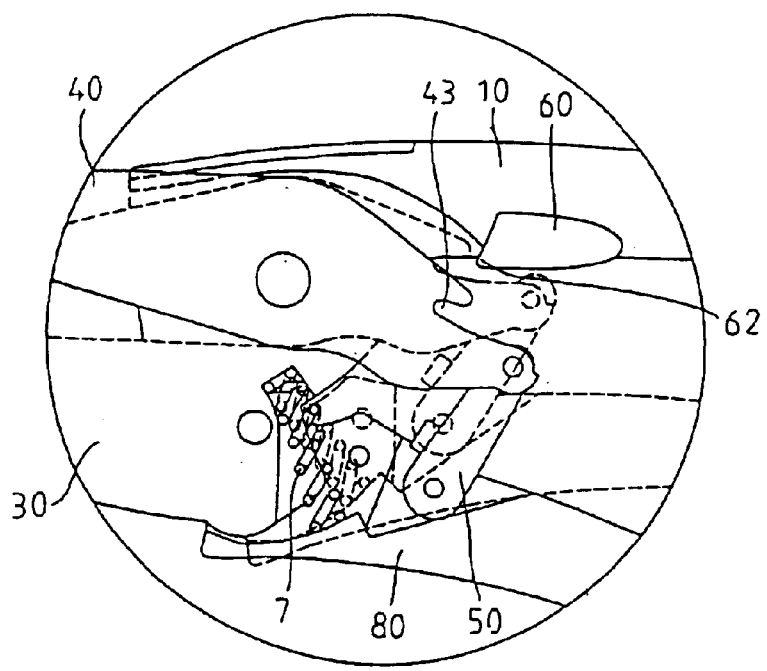
FIG. 4 is a schematic operational view of the scissors as shown in FIG. 3 in use.

After the switch 60 is moved on the first handle 10 to detach the bottom plate 62 of the switch 60 from the locking groove 43 of the blade 40 as shown in FIG. 4, the blade 40 is released from the first handle 10 and can be pivoted freely. At this time, the mediate portion of the second handle 80 is pressed by the restoring force of the spring 7 to move downward relative to the first handle 10, so that the second end of the connecting member 50 is moved downward by the mediate portion of the second handle 80, and the first end of the blade 40 is moved downward by the first end of the connecting member 50. Thus, the mediate portion of the blade 40 is pivoted upward about the pivot bolt 2, so that the second end of the blade 40 is moved upward relative to the blade seat 30.

When the user's one hand exerts a press force to move the second handle 80 toward the grip 18 of the first handle 10, the mediate portion of the second handle 80 is moved upward relative to the first handle 10 to compress the spring 7, so that the second end of the connecting member 50 is moved upward by the mediate portion of the second handle 80, and the first end of the blade 40 is moved upward by the first end of the connecting member 50. Thus, the mediate portion of the blade 40 is pivoted downward about the pivot bolt 2, so that the second end of the blade 40 is moved downward relative to the blade seat 30 so as to cut the plant between the blade 40 and the blade seat 30.

Accordingly, the spring 7 mounted between the first handle 10 and the second handle 80 is disposed at an oblique state, thereby decreasing the pressing force applied on the user's hand, so that the user can hold the grip 18 of the first handle 10 and the second handle 80 smoothly and comfortably, thereby facilitating the user operating the pruning shears. In addition, the spring 7 mounted between the first handle 10 and the second handle 80 is disposed at an oblique state, thereby obtaining the optimum support effect. Further, the spring 7 is located adjacent to the pivot pin 6 between the second handle 80 and the first handle 10, thereby providing the optimum effect to restore the second handle 80 to the original position.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A pair of pruning shears, comprising:
    a first handle;
    a blade seat mounted on a first end of the first handle;
    a blade having a mediate portion pivotally mounted on the first end of the first handle;
    a second handle having a first end pivotally mounted on the first end of the first handle;
    a connecting member having a first end pivotally mounted on a first end of the blade and a second end pivotally mounted on a mediate portion of the second handle; and
    a spring mounted between the first end of the first handle and the first end of the second handle and disposed at an oblique state for pressing the mediate portion of the second handle to move downward relative to the first handle to move the connecting member downward so as to move the blade upward relative to the first handle and the blade seat.

2. The scissors in accordance with claim 1, wherein the first end of the first handle is formed with a shaft hole, the mediate portion of the blade is formed with a shaft hole, and the pruning shears further comprise a pivot bolt extended through the shaft hole of the first handle and the shaft hole of the blade, and a nut screwed on an outer thread of the pivot bolt, so that the mediate portion of the blade is pivotally mounted on the first end of the first handle.

3. The scissors in accordance with claim 2, further comprising a cover mounted on the first end of the first handle to encompass the pivot bolt and the nut.

4. The scissors in accordance with claim 3, wherein the first end of the first handle has a periphery formed with a plurality of fixing holes, and the cover has an inner wall formed with a plurality of fixing blocks inserted into the fixing holes of the first handle, so that the cover is fixed on the first handle.

5. The scissors in accordance with claim 3, wherein the cover is formed with a passage for passage of the blade.

6. The scissors in accordance with claim 1, wherein the first end of the first handle is formed with a receiving chamber for mounting the blade.

7. The scissors in accordance with claim 1, wherein the blade seat includes an abutting plate secured on the first end of the first handle and juxtaposed to the blade, a bushing mounted on the abutting plate, an end cap mounted on the bushing, and a screw extended through the end cap and the bushing and screwed into a screw bore formed in the abutting plate.

8. The scissors in accordance with claim 1, wherein the first end of the blade is formed with a through hole, the first end of the connecting member is formed with a through hole, and the pruning shears further comprise a pivot pin extended through the through hole of the connecting member and the through hole of the blade, so that the first end of the connecting member is pivotally mounted on the first end of the blade.

9. The scissors in accordance with claim 1, wherein the second end of the connecting member is formed with a through hole, the mediate portion of the second handle is formed with a through hole, and the pruning shears further comprise a pivot pin extended through the through hole of the second handle and the through hole of the connecting member, so that the second end of the connecting member is pivotally mounted on the mediate portion of the second handle.

10. The scissors in accordance with claim 1, wherein the first end of the first handle has a lower portion formed with a pin hole, the first end of the second handle is formed with a pin hole, and the pruning shears further comprise a pivot pin extended through the pin hole of the second handle and the pin hole of the first handle, so that the first end of the second handle is pivotally mounted on the first end of the first handle.

11. The scissors in accordance with claim 10, wherein the second handle is formed with a limit hole located adjacent to the pin hole, and the pruning shears further comprise a limit pin extended through the limit hole of the second handle and rested on the spring for retaining the spring.

12. The scissors in accordance with claim 10, wherein the spring is located adjacent to the pivot pin between the second handle and the first handle.

13. The scissors in accordance with claim 1, wherein the first end of the first handle has a lower portion formed with a receiving recess, the second handle is formed with an opening, and the spring has a first end received in the receiving recess of the first handle and a second received in the opening of the second handle.

14. The scissors in accordance with claim 1, wherein the first end of the blade is formed with a locking groove, and the pruning shears further comprise a switch movably mounted on the first handle and having a bottom plate locked in the locking groove of the blade.

15. The scissors in accordance with claim 1, wherein the first handle has a mediate portion formed with a slideway, and the switch has two side walls each formed with a protruding slide slidably mounted in the slideway of the first handle.

16. The scissors in accordance with claim 1, wherein the first handle has a second end formed with a grip.

* * * * *